(12) United States Patent
Takeshita

(10) Patent No.: US 7,084,907 B2
(45) Date of Patent: Aug. 1, 2006

(54) IMAGE-CAPTURING DEVICE

(75) Inventor: Tetsuya Takeshita, Yokohama (JP)

(73) Assignee: Nikon Corporation, Tokyo (JP)

( * ) Notice: Subject to any disclaimer, the term of this patent is extended or adjusted under 35 U.S.C. 154(b) by 799 days.

(21) Appl. No.: 10/043,186

(22) Filed: Jan. 14, 2002

(65) Prior Publication Data

US 2002/0106206 A1      Aug. 8, 2002

(30) Foreign Application Priority Data

Jan. 15, 2001    (JP)    ............................. 2001-006339

(51) Int. Cl.
*H04N 9/73* (2006.01)
(52) U.S. Cl. .................................. 348/223.1
(58) Field of Classification Search ............. 348/223.1; 340/370, 371
See application file for complete search history.

(56) References Cited

U.S. PATENT DOCUMENTS 6,072,526 A * 6/2000 Hashimoto et al. ...... 348/223.1
6,075,563 A * 6/2000 Hung ...................... 348/223.1
6,459,449 B1 * 10/2002 Juen ........................ 348/223.1

FOREIGN PATENT DOCUMENTS

| JP | A 2000-148978 | | 5/2000 |
|---|---|---|---|
| JP | 2000224608 | * | 8/2000 |
| JP | A 2000-224608 | | 8/2000 |

* cited by examiner

*Primary Examiner*—Tuan Ho
(74) *Attorney, Agent, or Firm*—Oliff & Berridge, PLC

(57) ABSTRACT

An image-capturing device includes: an image-capturing element that captures a subject image passing through a photographic lens and outputs an image-capturing signal; a chromaticity detection device that detects a chromaticity of the subject; a light source estimating device that estimates a type of light source illuminating the subject based upon the chromaticity detected by the chromaticity detection device; a gain calculating device that calculates a gain by using color temperature information corresponding to the light source type estimated by the light source estimating device; and a gain adjustment device that performs a gain adjustment by multiplying the image-capturing signal output by the image-capturing element by the gain calculated by the gain calculating device.

13 Claims, 17 Drawing Sheets

IMAGE-CAPTURING DEVICE

INCORPORATION BY REFERENCE

The disclosure of the following priority application is herein incorporated by reference: Japanese Patent Application No. 2001-006339 filed Jan. 15, 2000.

BACKGROUND OF THE INVENTION

1. Field of the Invention

The present invention relates to an image-capturing device utilized in an electronic camera or the like that captures a subject image and records electronic image data.

2. Description of the Related Art

There are electronic cameras in the known art having an image-capturing device that captures a subject image having passed through a photographic lens with a CCD or the like and outputs image data and an image processing circuit that performs image processing such as white balance adjustment and $\gamma$ correction by adjusting the amplification gains for the image data output from the image-capturing device. The image processing in the image processing circuit is executed by calculating parameters such as the R gain and the B gain for the white balance adjustment or the gradation curve for the $\gamma$ correction with a predetermined algorithm based upon the image data output from the image-capturing device.

In the electronic camera in the related art, a white balance adjustment coefficient is calculated so as to set the averages of color information corresponding to the main subject and the background of a captured image to a value indicating an achromatic color such as white or gray and the white balance adjustment is implemented on the image data using the adjustment coefficient thus calculated. Under normal circumstances, if the light source used to illuminate the subject is changed, the color of the subject appears different to the human eye. For instance, the subject color assumes a reddish tinge under sunlight in the morning or in the evening, whereas it assumes a greenish tinge under fluorescent light. If the white balance adjustment is implemented in the method of the related art in such a situation, the correction is executed using the complementary color of red or green, giving rise to the risk of a so-called color failure. Thus, a white balance adjustment failure tends to occur readily.

SUMMARY OF THE INVENTION

The present invention provides an image-capturing device utilized in an electronic camera or the like, which prevents color failure by estimating the type of light source in use when performing a white balance adjustment.

An image-capturing device according to the present invention comprises: a first image-capturing element that captures an image of a subject and outputs a first image-capturing signal; a second image-capturing element that captures an image of the subject and outputs a second image-capturing signal; a light source estimating device that estimates a type of light source illuminating the subject based upon the first image-capturing signal output from the first image-capturing element; and an image processing device that implements image processing on the second image-capturing signal output by the second image-capturing element based upon the light source type estimated by the light source estimating device.

Another image-capturing device according to the present invention comprises: an image-capturing element that captures an image of a subject and outputs an image-capturing signal; a light source estimating device that estimates a type of light source illuminating the subject based upon the image-capturing signal output from the image-capturing element; and an image processing device that implements image processing on the image-capturing signal output by the image capturing element based upon the light source type estimated by the light source estimating device.

Another image-capturing device according to the present invention comprises: an image-capturing element that captures a subject image passing through a photographic lens and outputs an image-capturing signal; a chromaticity detection device that detects a chromaticity of the subject; a light source estimating device that estimates a type of light source illuminating the subject based upon the chromaticity detected by the chromaticity detection device; a gain calculating device that calculates a gain by using color temperature information corresponding to the light source type estimated by the light source estimating device; and a gain adjustment device that performs a gain adjustment by multiplying the image-capturing signal output by the image-capturing element by the gain calculated by the gain calculating device.

In this image-capturing device, it is preferred that the chromaticity detection device detects the chromaticity of the subject based upon the image-capturing signal output by the image-capturing element.

Also, it is preferred that the chromaticity detection device includes a chromaticity detection image-capturing element which is independent of the image-capturing element and outputs a chromaticity detection image-capturing signal by capturing an image of the subject, and detects the chromaticity of the subject based upon the chromaticity detection image-capturing signal output by the chromaticity detection image-capturing element.

Also, it is preferred that the light source estimating device estimates the light source type by selecting a light source type corresponding to chromaticity information that roughly matches the chromaticity detected by the chromaticity detection device among a plurality of sets of chromaticity information provided in advance in correspondence to a plurality of specific light sources. In this case, it is preferred that the plurality of specific light sources include sunlight at a plurality of specific color temperatures and a plurality of specific types of fluorescent light; and the chromaticity information is provided discretely so that each set of chromaticity information indicates a color that is substantially achromatic under illumination with sunlight at each of the plurality of color temperatures or with one of the plurality of types of fluorescent light. Furthermore, it is preferred that the chromaticity detection device further detects whether or not the subject manifests a green color; and the light source estimating device does not select fluorescent light as the light source if the means for chromaticity detection detects that the subject manifests a green color.

Also, it is preferred that when the plurality of sets of chromaticity information are provided, the light source estimating device selects chromaticity information to be used from the plurality of sets of chromaticity information in correspondence to the brightness level of the subject.

Also, it is preferred that a first brightness level decision-making device that makes a decision as to whether or not a brightness level in each of specific areas obtained by dividing a photographic field is higher than a first predetermined value, is further provided, and: the chromaticity detection device detects the chromaticity of the subject in each of the specific areas; the light source estimating device estimates a light source type among the plurality of types of light sources for each area determined to manifest a higher brightness level by the first brightness level decision-making device by using the chromaticity detected in the area and estimates one type of light source as the light source for the subject based upon numbers of different light source types estimated in individual areas; and the gain calculating device calculates an average of levels of the chromaticity used by the light source estimating device when estimating one type of light source as the light source for the subject and calculates the gain by using color temperature information corresponding to the calculated average.

Also, it is preferred that a second brightness level decision-making device that makes a decision as to whether or not a brightness level in each of specific areas obtained by dividing a photographic field is higher than a second predetermined value, is further provided, and: the light source estimating device estimates a light source type among the plurality of types of light sources for each area determined to manifest a higher brightness level by the second brightness level decision-making device by using the chromaticity detected in the area and estimates one type of sunlight as the light source for the subject based upon numbers of different light source types estimated in individual areas; and the gain calculating device calculates an average of levels of the chromaticity used by the light source estimating device when estimating one type of sunlight as the light source for the subject and calculates the gain by using color temperature information corresponding to the calculated average. In this case, it is preferred that the gain calculating device calculates the gain by using predetermined specific color temperature information if the light source estimating device determines that sunlight at any color temperature is not the light source for the subject.

Also, it is preferred that the gain calculating device includes an LUT that outputs the gain by using the light source illuminating the subject and the color temperature information as arguments.

An electronic camera according to the present invention comprises: an image-capturing element that captures a subject image passing through a photographic lens and outputs an image-capturing signal; a chromaticity detection device that detects a chromaticity of the subject; a light source estimating device that estimates a type of light source illuminating the subject based upon the chromaticity detected by the chromaticity detection device; a gain calculating device that calculates a gain by using color temperature information corresponding to the light source type estimated by the light source estimating device; and a gain adjustment device that performs a gain adjustment by multiplying the image-capturing signal output by the image-capturing element by the gain calculated by the gain calculating device.

An image processing device according to the present invention comprises: an image-capturing signal intake unit that obtains an image-capturing signal related to a subject an image of which has been captured by an image-capturing element; a light source estimating unit that estimates a type of light source illuminating the subject based upon the image-capturing signal that has been obtained; and an image processing unit that implements image processing on the image-capturing signal that has been obtained based upon the light source type estimated by the light source estimating device.

A computer-readable computer program product according to the present invention contains an image processing program, and the image processing program comprises: image-capturing signal acquisition instructions for obtaining an image-capturing signal related to a subject an image of which has been captured by an image-capturing element; light source estimate instructions for estimating a type of light source illuminating the subject based upon the image-capturing signal that has been obtained; and image-processing instructions for implementing image processing on the image-capturing signal that has been obtained based upon the light source type estimated by the light source estimating device.

BRIEF DESCRIPTION OF THE DRAWINGS

FIG. 17 shows how the program may be provided in a recording medium such as a CD-ROM or via a data signal on the Internet or the like.

DESCRIPTION OF THE PREFERRED EMBODIMENTS

First Embodiment

Figure 1:
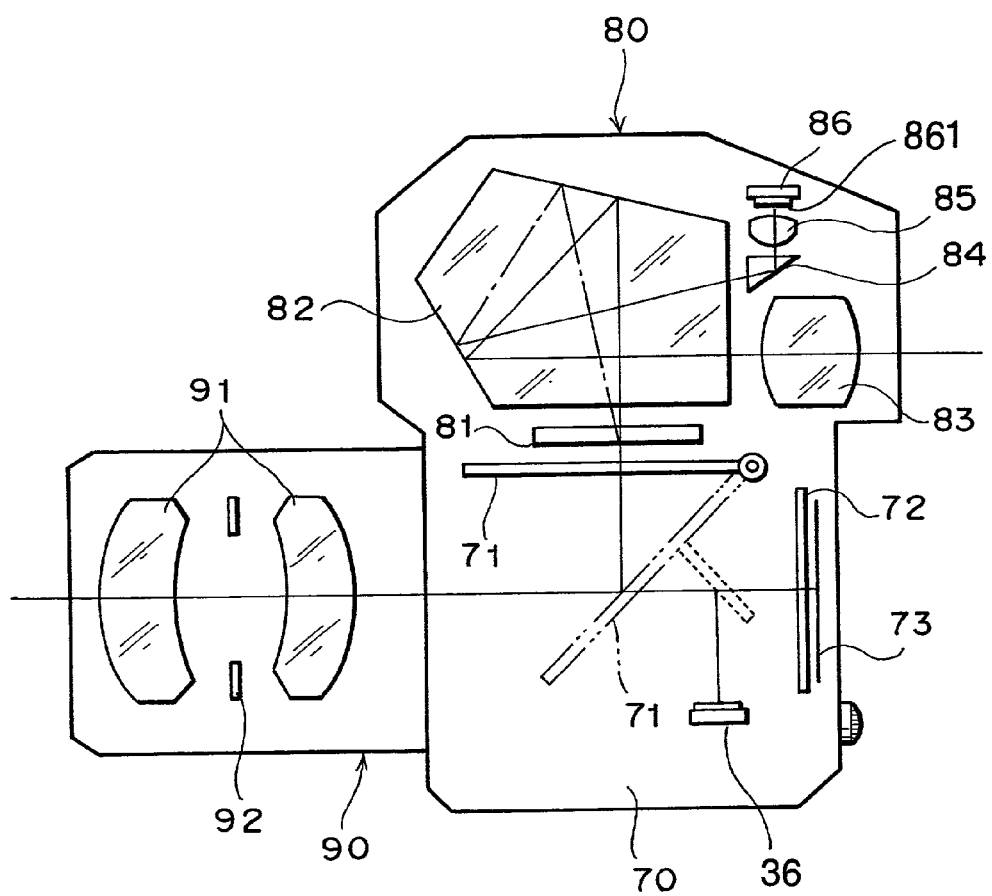
FIG. 1 shows the structure assumed in a single lens reflex electronic still camera achieved in a first embodiment.

The following is an explanation of the first embodiment of the present invention, given in reference to the drawings. FIG. 1 illustrates the single lens reflex electronic still camera achieved in an embodiment of the present invention. The electronic still camera in FIG. 1 includes a camera main body 70, a viewfinder device 80 detachably mounted at the camera main body 70 and an exchangeable lens 90 internally provided with a lens 91 and an aperture 92, which is detachably mounted at the camera main body 70. Subject light having passed through the exchangeable lens 90 and having entered the camera main body 70 is guided to the viewfinder device 80 by a quick-return mirror 71 set at the position indicated by the dotted line prior to a shutter release, forms an image on a viewfinder mat 81 and also forms an image at a focal point detection device 36. The subject light having formed an image at the viewfinder mat 81 is further guided to an eyepiece lens 83 by a penta prism 82 and is also guided to a color sensor 86 by passing through a prism 84 and an image forming lens 85 to form a subject image at the color sensor 86. Following a shutter release, the quick-return mirror 71 is swung to the position indicated by the solid line and the subject light forms an image on a photographing image-capturing device 73 via a shutter 72. It is to be noted that the color sensor 86 is provided at a position which is conjugate with the position of the image-capturing device 73 relative to the photographic lens 91.

Figure 2:
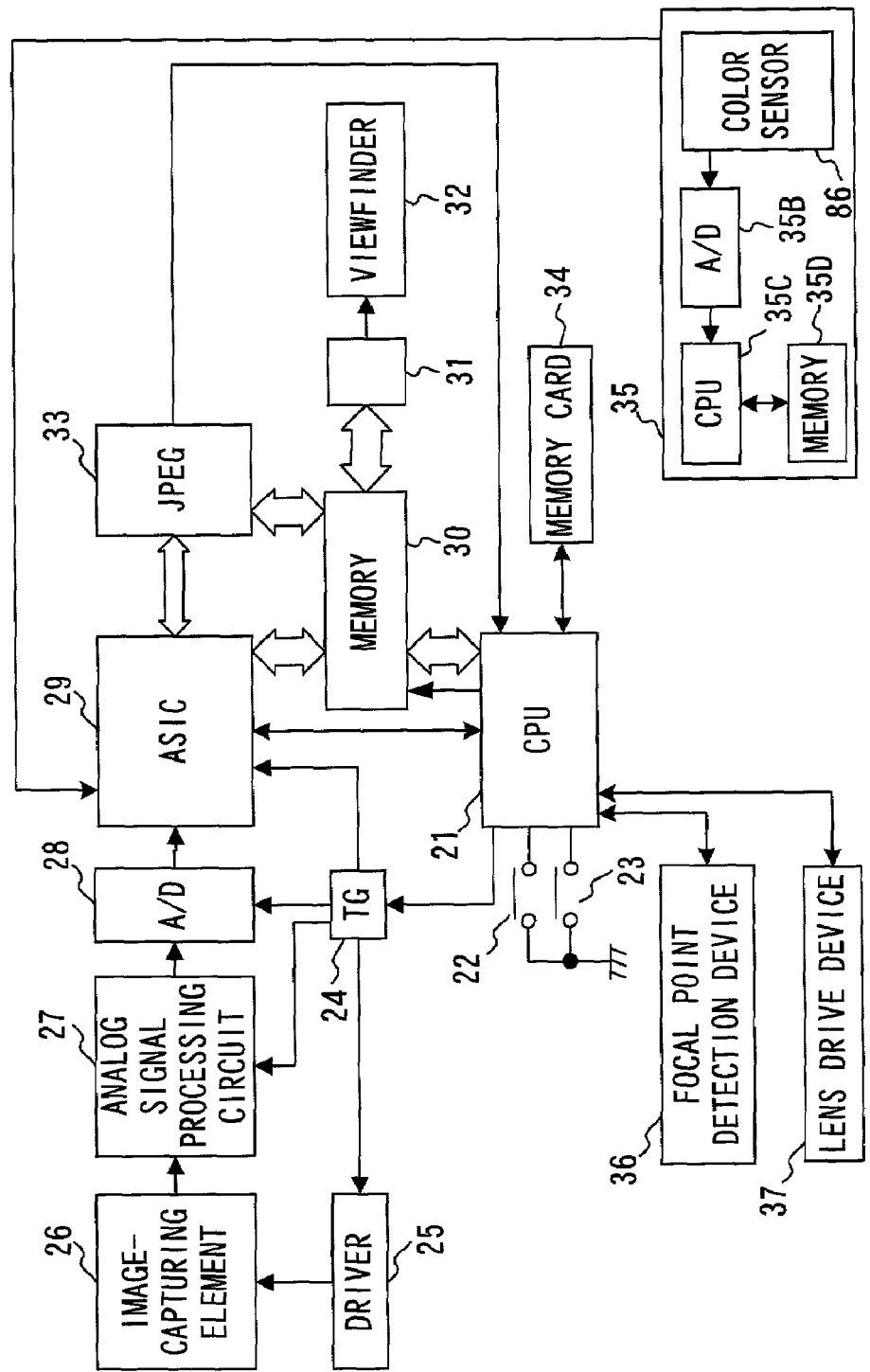
FIG. 2 presents a block diagram of the signal processing system in the single lens reflex electronic still camera achieved in the first embodiment.

FIG. 2 is a circuit block diagram of the electronic still camera. A halfway press signal and a full press signal are input to a CPU 21 respectively through a halfway-press switch 22 and a full-press switch 23 which interlock with the shutter release button. The focal point detection device 36 detects the focal adjustment state of the photographic lens 91 in response to a command issued by the CPU 21. A lens drive device 37 drives the photographic lens 91 to the focus position so as to form an image of the subject light entering the exchangeable lens 90 on an image-capturing element 26 of the image-capturing device 73. In addition, the CPU 21 implements drive control on the image-capturing element 26 of the image-capturing device 73 by driving a timing generator 24 and a driver 25. The operating timing of an analog processing circuit 27 and an A/D conversion circuit 28 is controlled by the timing generator 24.

As the full-press switch 23 is turned on following an ON operation of the halfway-press switch 22, the quick-return mirror 71 swings upward and the subject light from the exchangeable lens 90 forms an image on the light-receiving surface of the image-capturing element 26. The image-capturing element 26, which is constituted of a CCD, stores signal charges in correspondence to the brightness level of the subject image. The signal charges stored at the image-capturing element 26 are let out by the driver 25 and are input to the analog signal processing circuit 27 which includes an AGC circuit and a CDS circuit. The analog image signals thus input undergo analog processing such as gain control and noise removal at the analog signal processing circuit 27 and then are converted to digital signals at the A/D conversion circuit 28. The digitized image signals are then guided to an image processing CPU 29 which may be constituted as, for instance, an ASIC, where they undergo image preprocessing such as white balance adjustment, edge compensation and gamma correction to be detailed later.

The image data having undergone the image preprocessing further undergo format processing (image post processing) in preparation for JPEG compression and then the image data having undergone the format processing are temporarily stored in a buffer memory 30.

The image data stored in the buffer memory 30 are processed at a display image preparation circuit 31 to become display image data and the resulting image display data are displayed as the photographing results at a viewfinder 32 which may be an LCD. In addition, the image data stored in the buffer memory 30 undergo data compression at a predetermined rate through the JPEG method at a compression circuit 33 and the compressed data are recorded into a recording medium (CF card) 34 which may be a flash memory.

The white balance adjustment is executed at the image processing CPU 29. The image signals corresponding to R color and B-color among the image signals corresponding to R, G and B colors output from the A/D conversion circuit 28 are respectively multiplied by a white balance adjustment R gain and a white balance adjustment B gain. The values of the R gain and B gain used in the white balance adjustment are determined by a white balance detection circuit 35 and stored in a memory 35D in advance.

The white balance detection circuit 35 includes the color sensor 86 that detects the color of the subject, an A/D conversion circuit 35B that converts analog color signals output by the color sensor 86 to digital color signals, a CPU 35C that generates a white balance adjustment coefficient based upon the digitized color signals and the memory 35D in which a reference look-up table (LUT) is recorded. The CPU 35C determines the white balance adjustment R gain and the white balance adjustment B gain based upon the color signals detected at the color sensor 86 and records the gains in the memory 35D. In this embodiment, the CPU 35C estimates the type of light source used to illuminate the subject by using color signals output from the color sensor 86 and determines the white balance adjustment gains in conformance to the estimated light source type. Then, the image processing CPU 29 executes the white balance adjustment with the white balance adjustment gains determined by the CPU 35C.

Figure 3:
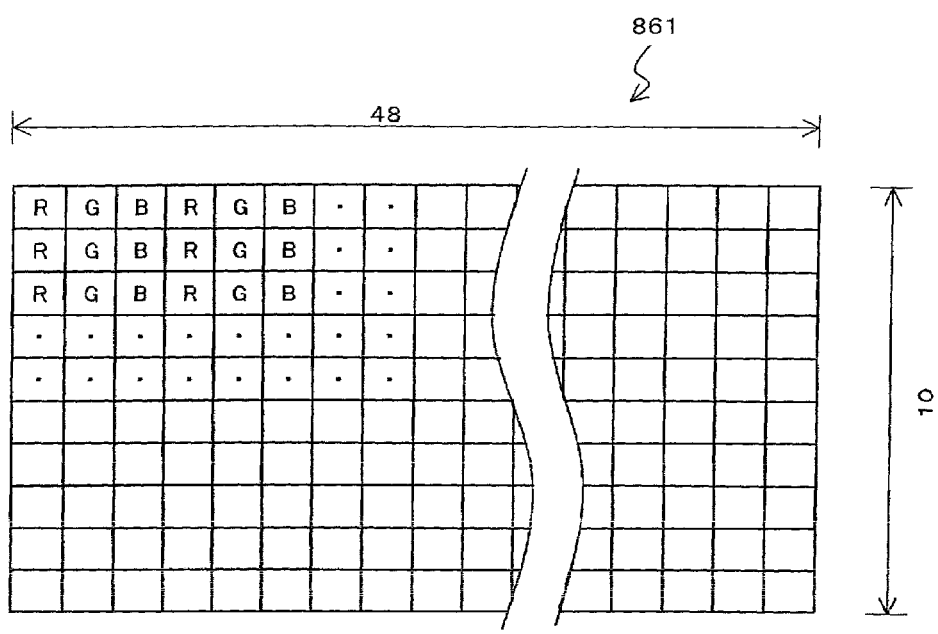
FIG. 3 shows the filter array assumed in the color sensor in the first embodiment.

The color sensor 86 maybe constituted of, for instance, a single two-dimensional image-capturing element having 480 pixels arrayed over 48 columns (across)×10 rows (down) as illustrated in FIG. 3. A color filter 861 having R, G or B color filters in correspondence to the 480 pixels is provided at the surface of the image-capturing element 86. As the subject light is captured by the color sensor 86 through the color filter 861, the subject light is separated into R-color signals, G-color signals and B-color signals and is captured as an image. The color signals are output from the color sensor 86 in units of 160 individual pixels over 16 columns (across)×10 rows (down) each corresponding to three adjacent pixels outputting an R-color signal, a G-color signal and a B-color signal. In other words, the color sensor 86 outputs color signals in correspondence to the 160 areas obtained by dividing its image-capturing surface into 160 portions.

Figure 4:
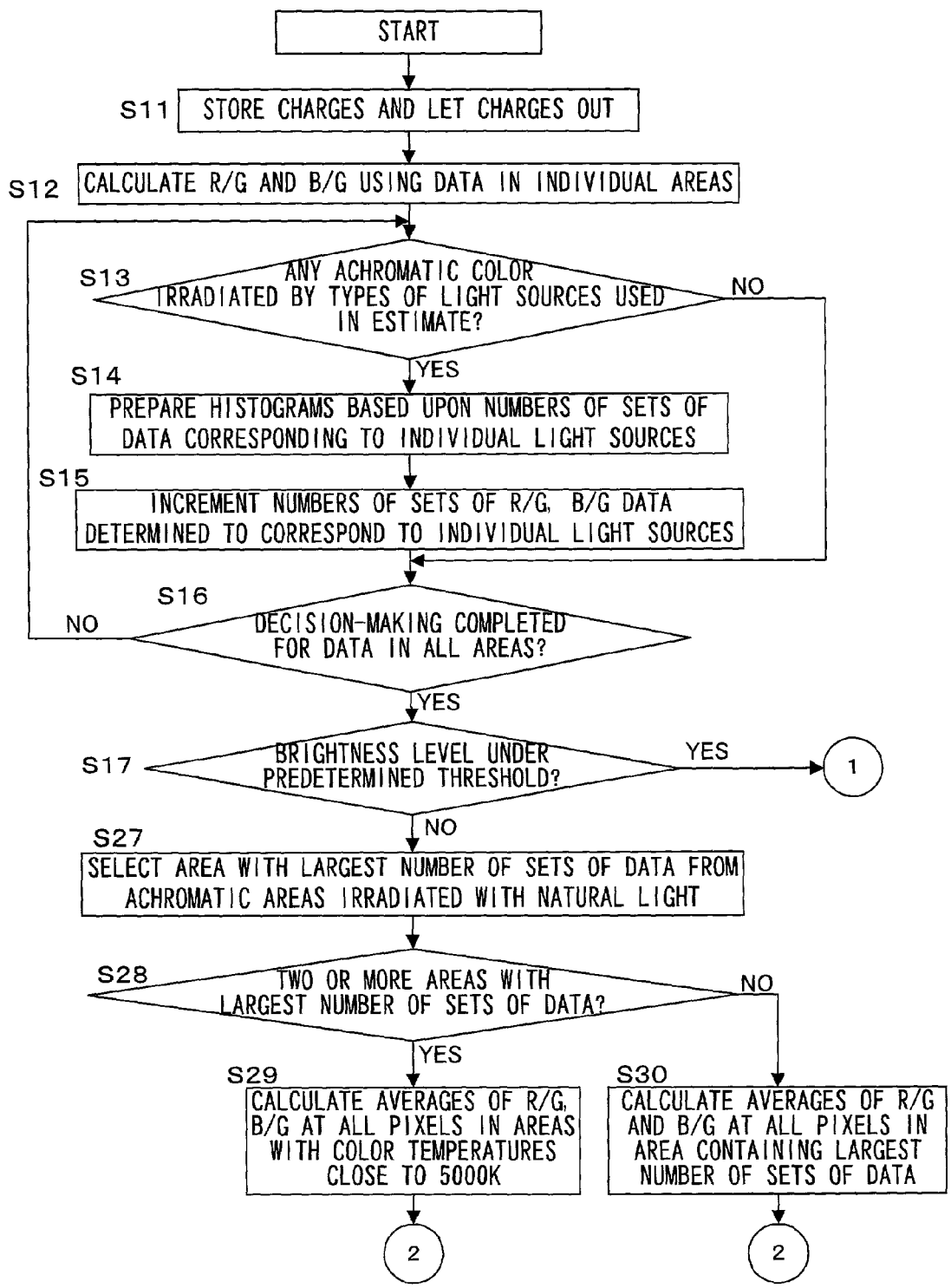
FIG. 4 presents a flowchart of the white balance adjustment gain determining processing implemented in the first embodiment.
Figure 5:
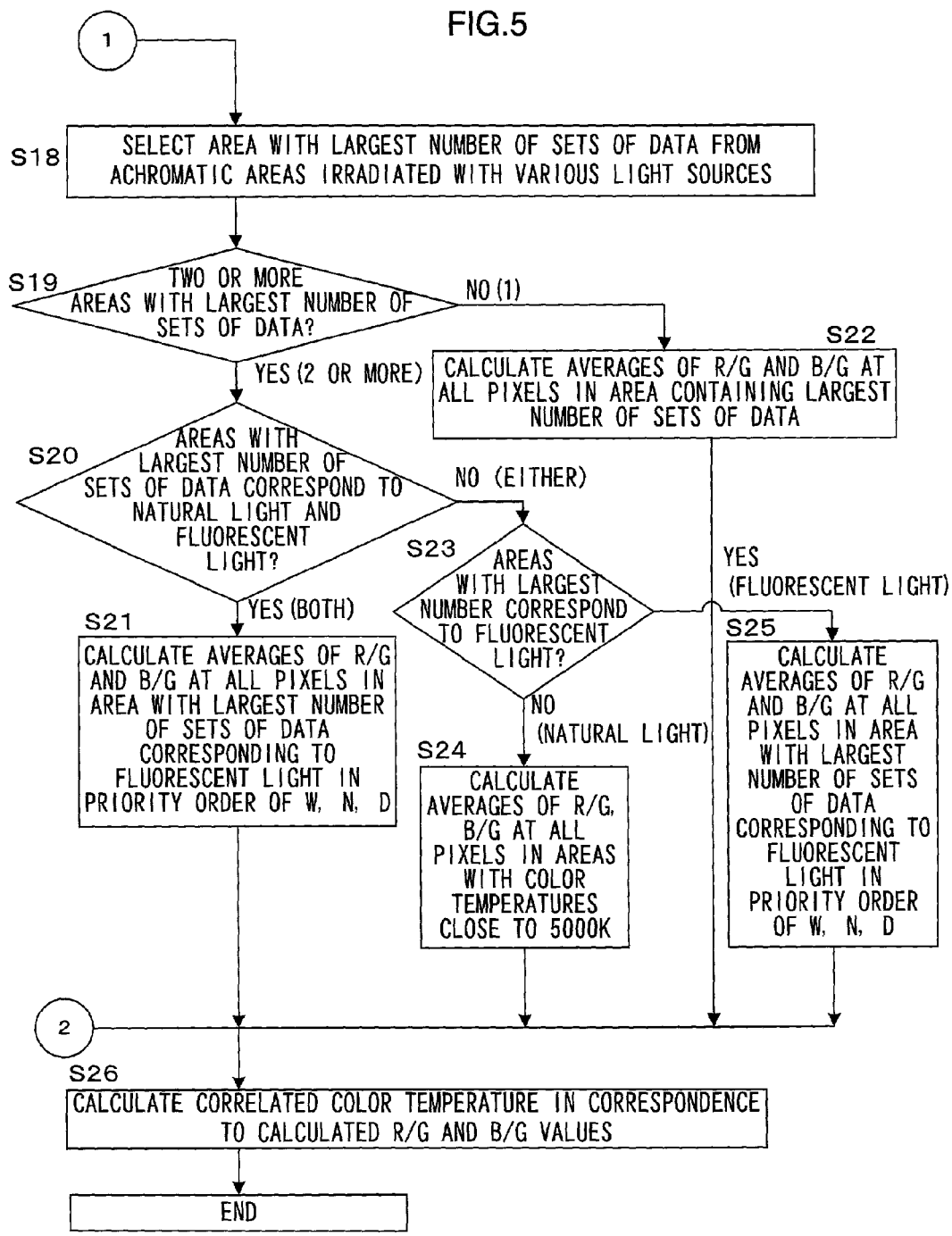
FIG. 5 presents a flowchart of the white balance adjustment gain determining processing implemented in the first embodiment.

FIGS. 4 and 5 present a flowchart of the processing implemented to determine the white balance adjustment gains in the embodiment. The processing in FIGS. 4 and 5 is repeatedly executed before the shutter is released in the electronic still camera. In step S11 in FIG. 4, signal charges are stored at the color sensor 86 and the stored charge signals are let out from the color sensor 86. The color signals thus let out are first converted to digital color signals at the A/D conversion circuit 35B and then are input to the CPU 35C. In step S12, the CPU 35C calculates the ratio of the R-color data and the G-color data and the ratio of the B-color data and the G-color data in each of the 160 pixels having a total of 480 color signals in R, G and B colors, which are input from the color sensor 86, and then the operation proceeds to step S13.

Figure 6:
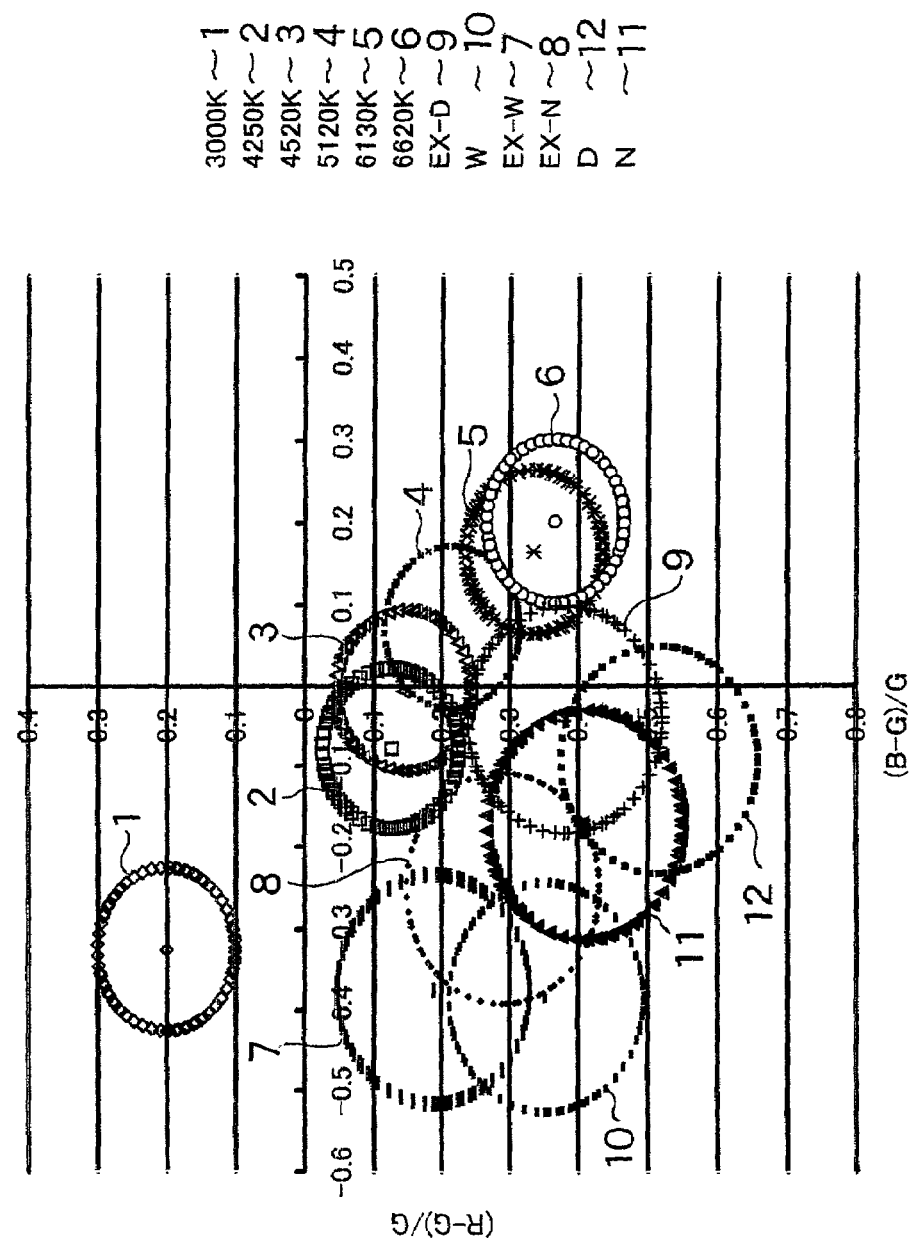
FIG. 6 shows the achromatic color distribution on a chromaticity coordinate system achieved in the first embodiment.

In step S13, the CPU 35C makes a decision as to whether or not there are any data indicating an achromatic color among the 160 sets of chromaticity data (R−G)/G and (B−G)/G that have been calculated. The CPU 35C makes an affirmative decision if there are achromatic color data and proceeds to step S14, whereas it makes a negative decision in step S13 if there are no achromatic color data present and proceeds to step S16. FIG. 6 shows the achromatic color distribution on a chromaticity coordinate system. In FIG. 6, the vertical axis represents (R−G)/G and the horizontal axis represents (B−G)/G.

The chromaticity of an achromatic subject illuminated by sunlight with a color temperature of 3000K is indicated over an area 1 in FIG. 6. The chromaticities of an achromatic subject illuminated by sunlight with color temperatures of 4250K, 4520K, 5120K, 6130K and 6620K are respectively indicated over areas 2~6. In addition, the chromaticity of an achromatic subject illuminated by a three-band color rendering cool white fluorescent lamp (EX-W) is indicated over an area 7. The chromaticities of achromatic subjects illuminated by a three-band color rendering day white fluorescent lamp (EX-N) and a three-band color rendering daylight fluorescent lamp (EX-D) are respectively indicated over areas 8 and 9. Areas 10~12 indicate the chromaticities of the achromatic subject illuminated with normal a cool white fluorescent lamp (W), a day white fluorescent lamp (N) and a daylight fluorescent lamp (D).

The CPU 35C judges that there are achromatic color data if any of the chromaticity data (R−G)/G and (B−G)/G are contained in one of the areas 1~12 in FIG. 6 and judges that there are no achromatic color data if none of the data are contained in the areas 1~12. In step S14 in FIG. 4, the CPU 35C creates histograms such as those shown in FIGS. 7 and 8 by counting the number of sets of chromaticity data determined to manifest brightness levels exceeding a first threshold value and to indicate an achromatic color in each of the areas 1~12, i.e., for each type of light source that may illuminate the subject before proceeding to step S15. The decision with regard to the brightness level is made based upon, for instance, whether or not the G-color signal indicates a value exceeding the first threshold value. The first threshold value is provided to enable decision-making as to whether or not a color signal detected by the color sensor 86 indicates a value that allows the type of light source to be estimated. In the histograms in FIGS. 7 and 8, chromaticity data determined to manifest brightness levels required for the light source type estimate and to indicate an achromatic color among the chromaticity data corresponding to the 160 pixels output from the color sensor 86 are sorted and classified in correspondence to the individual light source types.

In step S15, the CPU 35C increments the number of sets of chromaticity data having undergone the decision-making as to whether or not they indicate an achromatic color and then the CPU 35C proceeds to step S16. In step 516, the CPU 35C makes a decision as to whether or not the 160 sets of chromaticity data output from the color sensor 86 have all undergone the achromatic color decision-making process. The CPU 35C makes an affirmative decision in step S16 if the incremented value obtained through the processing in step S15 has reached 160 and proceeds to step S17, whereas it makes a negative decision in step S16 if the incremented value is smaller than 160 and returns to step S13.

In step S17, the CPU 35C makes a decision as to whether or not a brightness level detected by the color sensor 86 indicates a value exceeding a second threshold value. A value of larger than the first threshold value is set for the second threshold value which is provided to enable decision-making as to whether or not the brightness level is sufficiently high. The CPU 35C makes an affirmative decision in step S17 if the G-color signal indicates a value equal to or smaller than the second threshold value and proceeds to step S18 in FIG. 5, whereas it makes a negative decision in step S17 if the value of the G-color signal exceeds the second threshold value and proceeds to step S27.

In step S18 in FIG. 5, the CPU 35C selects the area containing the greatest number of sets of chromaticity data among the areas (the areas 1~12 in FIG. 6) indicating the chromaticities of the achromatic subject illuminated by the various types of light sources, i.e., the CPU 35C selects the type of light source with the largest number of sets of chromaticity data, before proceeding to step S19. By selecting the light source corresponding to the area containing the largest number of sets of chromaticity data, the CPU 35C estimates the type of light source illuminating the subject. In step S19, the CPU 35C makes a decision as to whether or not there are two or more areas containing the largest number of sets of chromaticity data and it makes an affirmative decision in step S19 if there are two or more such areas to proceed to step S20, whereas it makes a negative decision in step S19 if there is only one such area to proceed to step S22.

In step S20, the CPU 35C makes a decision as to whether or not the light sources corresponding to the plurality of selected areas include natural light (sunlight) and fluorescent light, i.e., whether or not the selected areas include at least one of the areas 1~6 and one of the areas 7~12. The CPU 35C makes an affirmative decision in step S20 if the light sources include both sunlight and fluorescent light and proceeds to step S21, whereas it makes a negative decision in step S20 if the light sources only include either sunlight or fluorescent light and proceeds to step S23.

In step S21, the CPU 35C selects the area among the areas 7~12 representing the fluorescent light sources that contains the largest number of sets of chromaticity data, and calculates the averages of R/G and B/G by using all the data contained in this area. It is to be noted that in the processing in step S21, the data in the areas 7~12 representing the fluorescent light sources instead of the data in the areas 1~6 representing the sunlight sources are used. In addition, the area selection is made in the priority order of; 1) cool white fluorescent light, 2) day white fluorescent light, 3) daylight fluorescent light if there are two or more areas containing the largest number of sets of chromaticity data among the areas 7~12 representing the fluorescent light sources. Once the averages of R/G and B/G are calculated by using all the data in the selected area, the operation proceeds to step S26.

In step S22, to which the operation proceeds after making a negative decision in step S19, the CPU 35C calculates the averages of R/G and B/G by using all the data within the area containing the largest number of sets of chromaticity data before proceeding to step S26.

In step S23, to which the operation proceeds after making a negative decision in step S20 as explained above, the CPU 35C makes a decision as to whether the areas containing the greatest number of sets of chromaticity data represent sunlight sources or fluorescent light sources. The CPU 35C makes an affirmative decision in step S23 if the two or more areas are all estimated to represent fluorescent light sources to proceed to step S25, whereas it makes a negative decision in step S23 if the two or more areas are estimated to represent sunlight sources to proceed to step S24.

In step S24, the CPU 35C calculates the averages of R/G and B/G by using all the data contained in, for instance, the areas 3 and 4 before proceeding to step S26. The data in the area 3 and the area 4 are utilized in this process to calculate the averages of R/G and B/G with data in areas corresponding to sunlight with color temperatures close to 5000 K. In step S25, to which the operation proceeds after making an affirmative decision in step S23, the CPU 35C calculates the averages of R/G and B/G by using all the data contained in an area with the largest number of sets of chromaticity data among the areas 7~12 corresponding to fluorescent light. Since there are two or more areas containing the largest number of sets of chromaticity data among the areas 7~12 representing the fluorescent light sources, the area selection is made at this time in the priority order of 1) cool white fluorescent light, 2) day white fluorescent light and 3) daylight fluorescent light. Once the averages of R/G and B/G are calculated with all the data within the selected area, the CPU 35C proceeds to step S26.

Figure 9:
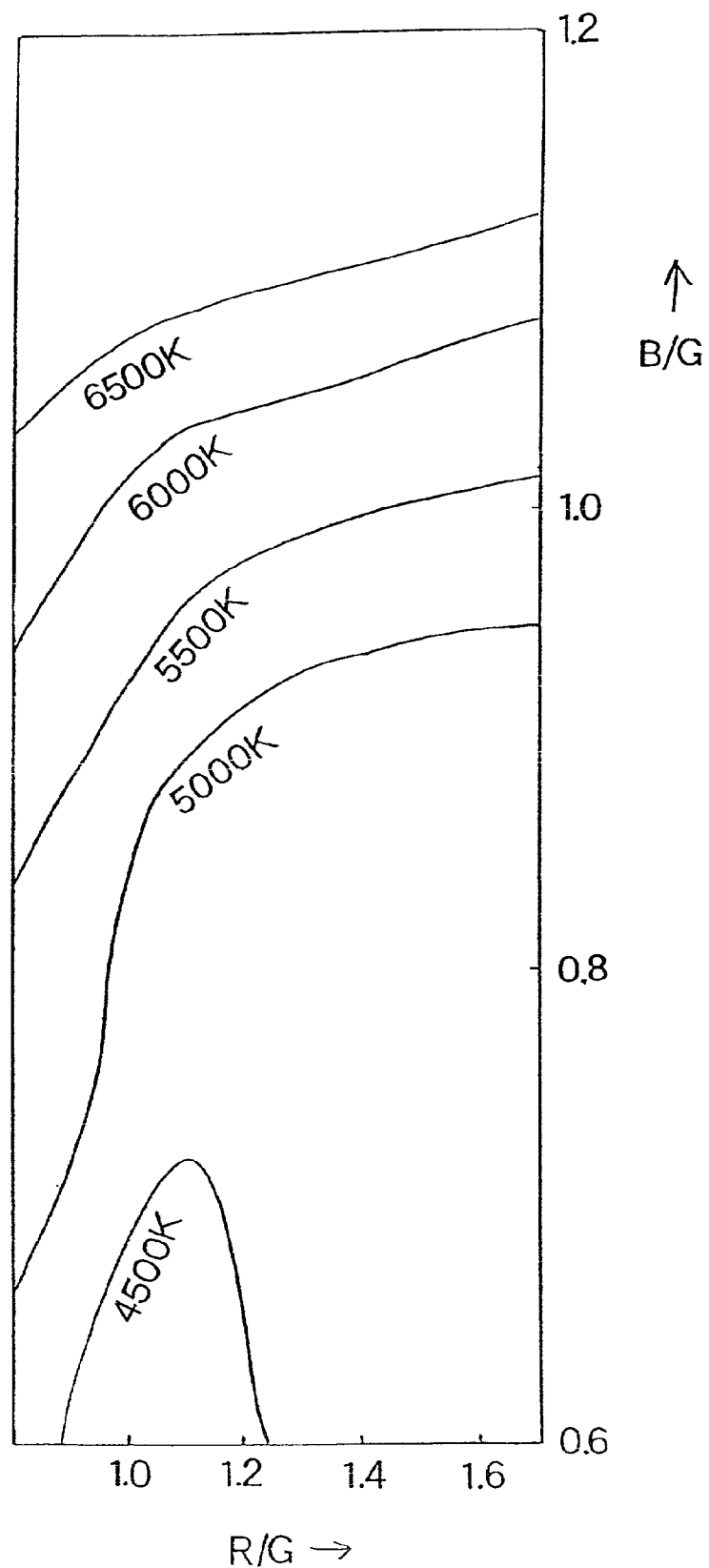
FIG. 9 shows the correlated color temperature curves mapped on an R/G-B/G coordinate system in the first embodiment.

In step S26, the CPU 35C calculates the correlated color temperature by using the data in the memory 35D based upon the calculated averages of R/G and B/G. FIG. 9 presents correlated color temperature curves, with the horizontal axis representing R/G and the vertical axis representing B/G. By dividing the values of the R signal and the B signal by the value of the G signal, the rates of the red color component and the blue color component in the subject color can be expressed without using the subject brightness level. As the color temperature increases, the blue color component becomes more pronounced, whereas as the color temperature becomes lower, the red color component becomes more pronounced. By storing in advance the correlated color temperature curves in FIG. 9 in the memory 35D as a look-up table, the CPU 35C is enabled to read out the correlated color temperature from the memory 35D in correspondence to the calculated averages of R/G and B/G.

Figure 10:
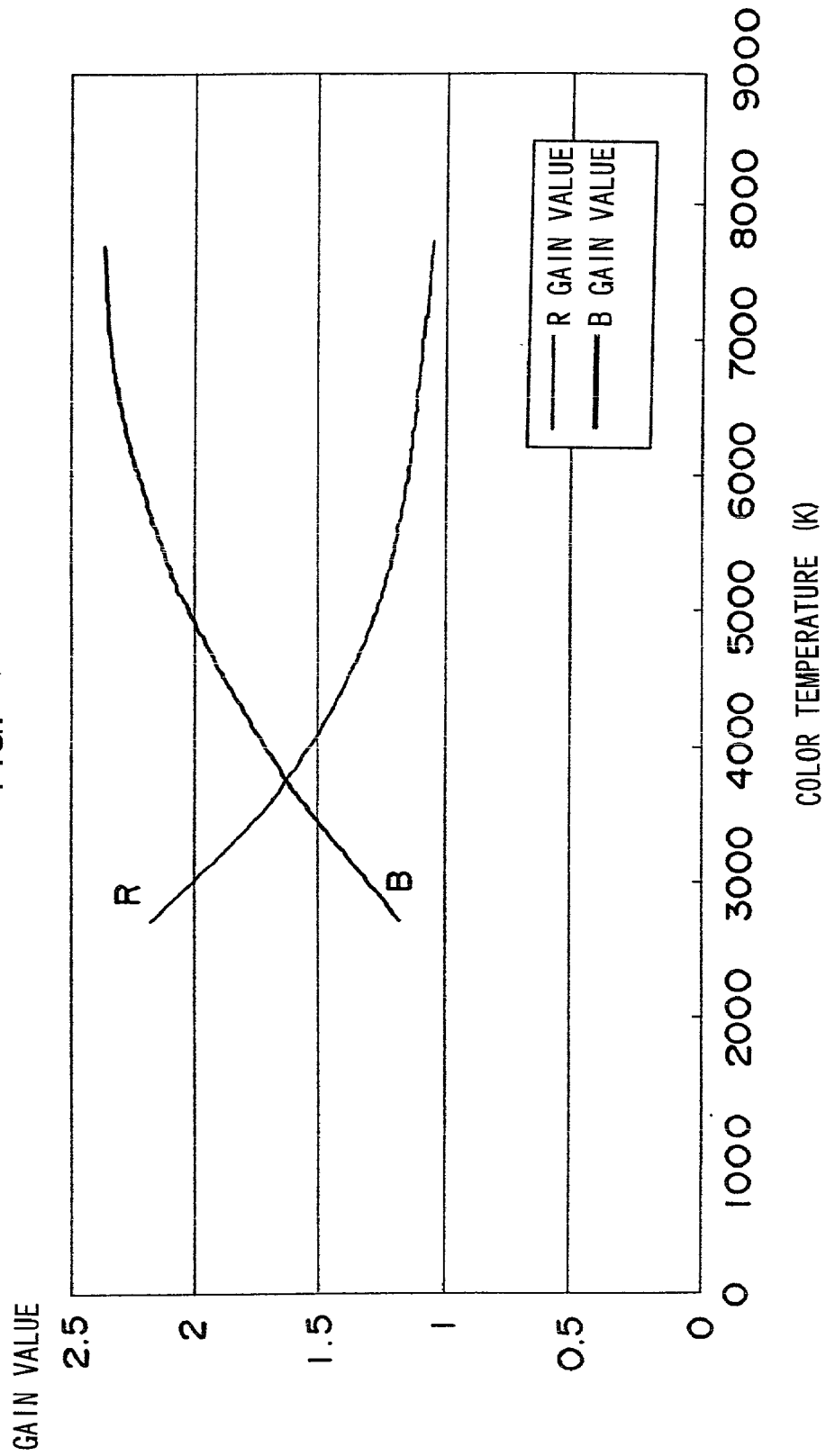
FIG. 10 shows the relationships between the correlated color temperature and the white balance adjustment gains.

The CPU 35C determines a white balance adjustment R gain and a white balance adjustment B gain based upon the correlated color temperature thus ascertained. FIG. 10 shows the relationships of the R gain and the B gain to the correlated color temperature. The values of the R gain and B gain are determined in advance through measurement so as to render the color of the subject illuminated by the estimated type of light source closer to the color perceived by the human eye and are expressed as functions of the color temperature. The values of the R gain and the B gain are stored in advance in the memory 35D as a look-up table and are read out from the memory 35D in correspondence to the correlated color temperature. The CPU 35C determines the white balance adjustment R gain for the R data and the white balance adjustment B gain for the B data in correspondence to the correlated color temperature and stores the R gain and B gain thus determined into the memory 35D before ending the processing shown in FIGS. 4 and 5.

In step S27, to which the operation proceeds after making a negative decision in step S17 as explained earlier, the CPU 35C selects an area with the largest number of sets of chromaticity data among the areas 1~6 representing the sunlight sources and proceeds to step S28. It is to be noted that the data in the areas 1~6 representing the sunlight sources instead of the data in the areas 7~12 representing the fluorescent light sources are used in the processing in step S27, since the light source in use is estimated to be sunlight if the value indicated by the G-color signal exceeds the second threshold value mentioned earlier. In step S28, the CPU 35C makes a decision is made as to whether or not there are two or more areas with the largest number of sets of chromaticity data, and an affirmative decision in step S28 if there are two or more such areas to proceed to step S29, whereas it makes a negative decision in step S28 if there is only one such area to proceed to step S30.

In step S29, the CPU 35C calculates the averages of R/G and B/G by using all the data contained in, for instance, the areas 3 and 4 before proceeding to step S26 in FIG. 5. The data in the area 3 and the area 4 are utilized in this process to calculate the averages of R/G and B/G with data in areas corresponding to sunlight with color temperatures close to 5000 K, in order to execute a gain adjustment suitable for, for instance, a night scene photographing operation by calculating the gains with predetermined color temperature information if no specific type of light source has been estimated. In step S30, to which the operation proceeds if a negative decision is made in step S28, the CPU 35C calculates the averages of R/G and B/G by using all the data contained in the area with the largest number of sets of chromaticity data and then proceeds to step S26 in FIG. 5.

The white balance adjustment coefficients determined as explained above are used during a white balance adjustment executed at the image processing CPU 29 on image data obtained through a subsequent image-capturing operation at the image-capturing element 26. The white balance adjustment is executed by multiplying all the values of the R signals and the B signals in the entire area in which the image-capturing element 26 captures an image by the white balance adjustment R gain and the white balance adjustment B gain respectively regardless of in which of the 160 pixel areas the color signals that were utilized in the light source type estimate were detected by the color sensor 86.

The relationships of the R gain and the B gain to the correlated color temperature shown in FIG. 10 may sometimes change depending upon whether the photographing operation is performed under natural light or under fluorescent light. In such a case, it is necessary to adjust the white balance adjustment gains. Generally speaking, the color temperature of RGB data obtained through a photographing operation performed under fluorescent light is higher than the color temperature of RGB data obtained through a photographing operation performed under natural light. This difference in the color temperature can be adjusted by correcting the values of the R gain and the B gain in FIG. 10 by a predetermined extent. Accordingly, 12 sets of look-up tables having stored therein R gain and B gain values are set in the memory 35D for natural light photographing (corresponding to the areas 1~6) and fluorescent light photographing (corresponding to the areas 7~12) and the matching look-up table among the 12 sets of look-up tables prepared in advance is read out from the memory 35D in correspondence to the estimated light source type.

The features of the embodiment are now summarized.

(1) The areas 1~12 over which the chromaticities indicating achromatic color data are set in advance on a chromaticity coordinate system in correspondence to sunlight with a plurality of color temperatures and fluorescent light of different types, and the chromaticities (R−G)/G and (B−G)/G are calculated by using the color signal outputs from the 160 pixels at the color sensor 86. An area containing the greatest number of sets of chromaticity data among the 160 sets of chromaticity data thus calculated is selected from the 12 areas and the light source type corresponding to this area is estimated. Since the chromaticity data are detected from the 160 pixel areas obtained by dividing the photographic field into 160 portions, the likelihood of chromaticity data indicating an achromatic color present in some of the 160 pixel areas increases, to make it possible to estimate the light source type, even when the subject color is chromatic as well as when the subject color is achromatic.

(2) As the areas 1~12 are set in correspondence to the 12 types of light sources, i.e., sunlight (natural light) achieving color temperatures of 3000 K, 4250 K, 4520 K, 5120 K, 6130K and 6620K, standard fluorescent light lamps emitting cool white light, day white light and daylight and three-band color rendering fluorescent lamps emitting cool white light, day white light and daylight, a light source type can be estimated from all types of illuminating light that may be used under normal circumstances. As a result, even if the light source is changed, a high quality color image can be obtained by determining correct white balance adjustment gains in conformance to the bright line spectrum of the light emitted by a specific type of light source.

(3) If the value indicated by the G-color signal exceeds the second threshold value indicating a high enough brightness level, the light source is assumed to be sunlight (step S27). If the values of the B-color data signal is sufficiently high, the light source is assumed to be sunlight even when one of the areas 7~12 corresponding to fluorescent light sources contains the greatest number of sets of chromaticity data. Under normal circumstances, the G-color component in illuminating light emitted by a fluorescent lamp is more pronounced. If an erroneous decision is made that the light source is a fluorescent lamp when a great deal of G-color is contained in the photographic field as in a landscape photographed under sunlight, a color failure may occur due to excessive color correction performed with the complementary color of G-color during the white balance adjustment. Accordingly, if the values of the G-color signal exceeds the second threshold value, the light source is assumed to be sunlight to prevent such a color failure.

(4) If the value of the G-color signal is equal to or lower than the first threshold value required for the light source type estimate, the data are not counted as chromaticity data to be used in the light source type estimate and thus are not used in the histogram (step S14). As a result, the adverse effect of noise attributable to the use of signals with excessively low levels in the estimate is prevented. Furthermore, it is possible to estimate the type of light source that illuminates the subject with a high level of intensity.

(5) Since the color sensor 86 is provided inside the viewfinder device 80, the white balance detection data are received at the color sensor 86, the white balance adjustment gains are determined and they are stored into the memory 35D before the mirror 71 is raised in response to an operation of the full-press switch 23. As a result, it is not necessary to determine the white balance adjustment gains during the photographing sequence implemented in response to an operation of the full-press switch 23, to achieve a reduction in the photographing processing time compared to the length of time required when determining the white balance adjustment gains during the photographing sequence.

(6) Since the relationships of the R gain and the B gain to the correlated color temperature are stored in advance in the memory 35 as a look-up table, the length of time required for the arithmetic processing can be reduced.

Second Embodiment

Since the structure assumed in the electronic still camera in the second embodiment and its circuit block diagram are identical to the structure of the electronic still camera achieved in the first embodiment as illustrated in FIG. 1 and the circuit block diagram presented in FIG. 2 respectively, their explanation is omitted. In addition, the color sensor 86 is constituted of a single two-dimensional image-capturing element having 480 pixels arrayed over 48 columns (across)×10 rows (down) as shown in FIG. 3 as in the first embodiment. Also as in the first embodiment, the color sensor 86 outputs color signals in correspondence to 160 areas obtained by dividing the image-capturing surface into 160 portions.

Figure 11:
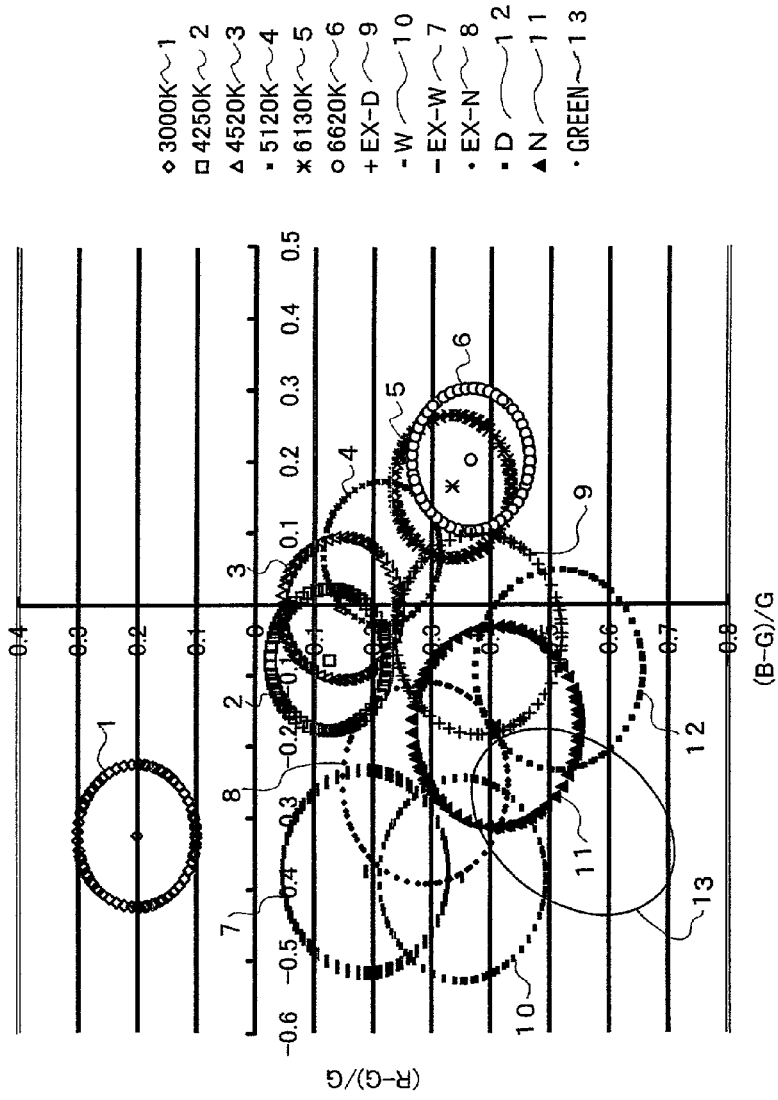
FIG. 11 shows the achromatic color distribution on a chromaticity coordinate system achieved in a second embodiment.

FIG. 11, which corresponds to FIG. 6 presented in conjunction with the first embodiment, shows the achromatic color distribution mapped on the chromaticity coordinate system in the second embodiment. It includes a green area 13 in addition to the areas in FIG. 6 illustrating the first embodiment. In the second embodiment, any data among the 160 sets of chromaticity data (R−G)/G and (B−G)/G calculated by the CPU 35C that are contained in the green area 13 are counted as well.

In the second embodiment, if the green area 13 contains the largest number of sets of chromaticity data, control is implemented based upon a decision that the light source is sunlight. Namely, even if one of the areas 7~12 corresponding to the fluorescent light sources contains the second-largest number of sets of chromaticity data next to the green area 13, the light source is not determined to be a fluorescent lamp. Then, the area with the largest number of sets of chromaticity data is selected from the areas 1~6 representing the sunlight source and control is implemented by assuming that the light source is sunlight with the color temperature corresponding to the selected area. Thus, no erroneous decision that the light source irradiating the subject is a type of fluorescent light when, in reality, a green-colored subject is irradiated by sunlight.

Figure 12:
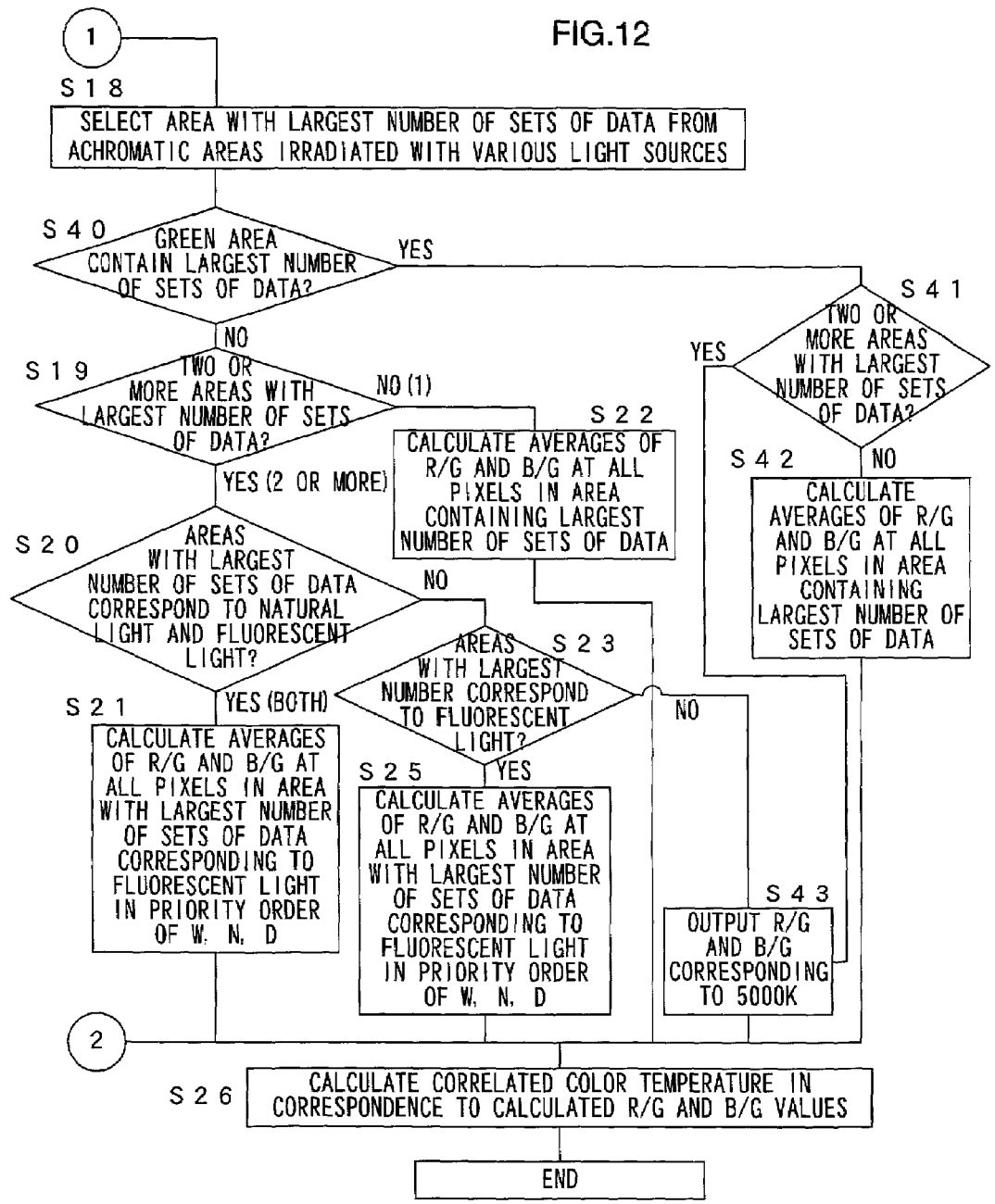
FIG. 12 presents a flowchart of the white balance adjustment gain determining processing implemented in the second embodiment.

FIG. 12 presents a flowchart of the white balance adjustment gain determining processing implemented in the second embodiment. The flowchart corresponds to the flowchart presented in FIG. 5 in conjunction with the first embodiment. The processing that corresponds to FIG. 4 illustrating the first embodiment is to be explained in reference to FIG. 4.

In step S13 in FIG. 4, the CPU 35C makes a decision as to whether or not there are any data indicating an achromatic color or any data contained in the green area 13 among the 160 sets of chromaticity data (R−G)/G and (B−G)/G that have been calculated. The CPU 35C makes an affirmative decision in step S13 if there are any achromatic color data or any data contained in the green area 13 and proceeds to step S14, whereas it makes a negative decision in step S13 if there are neither achromatic color data or data contained in the green area 13 and proceeds to step S16.

Figure 7:
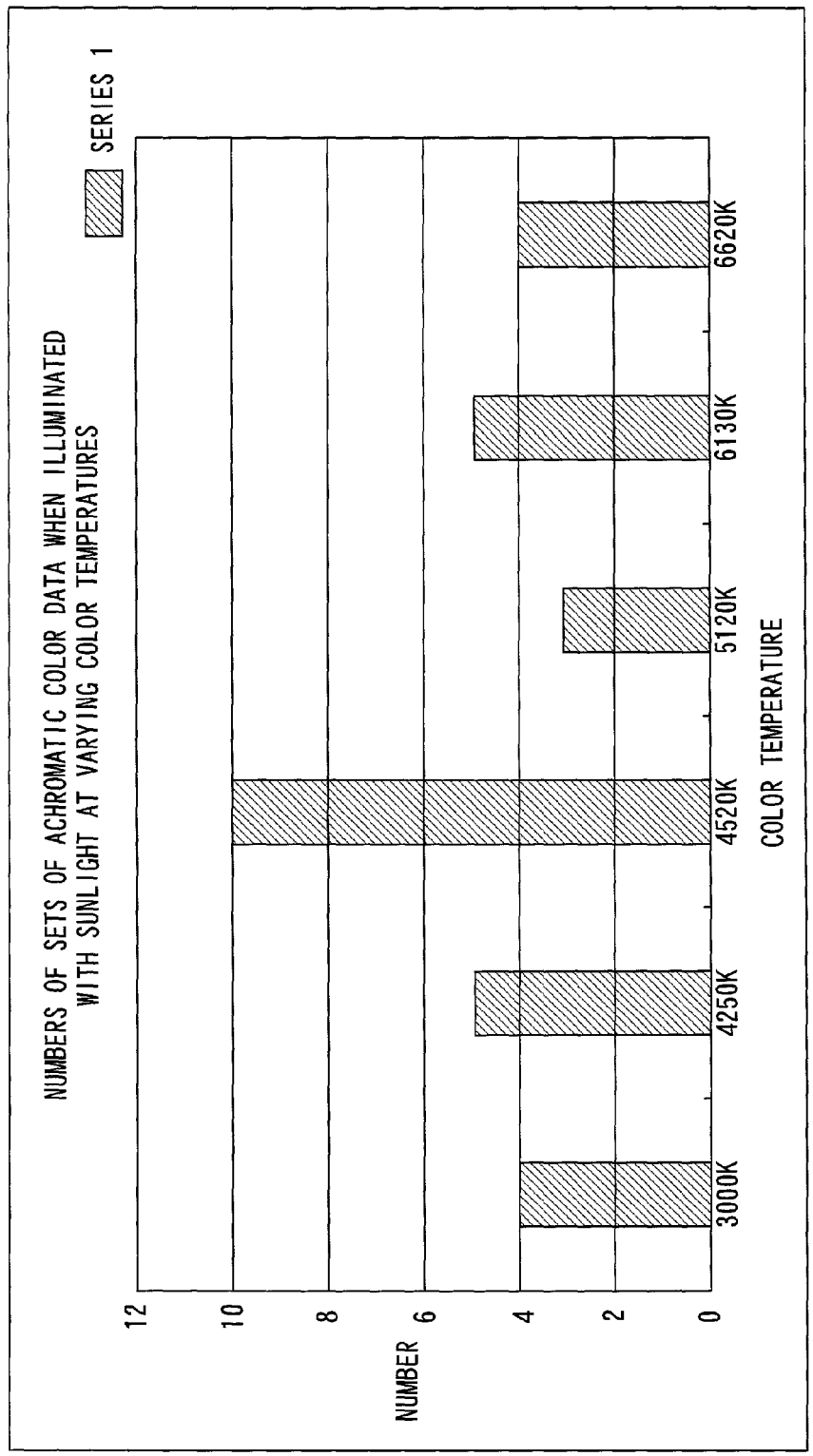
FIG. 7 presents a histogram of various areas obtained in the first embodiment.
Figure 8:
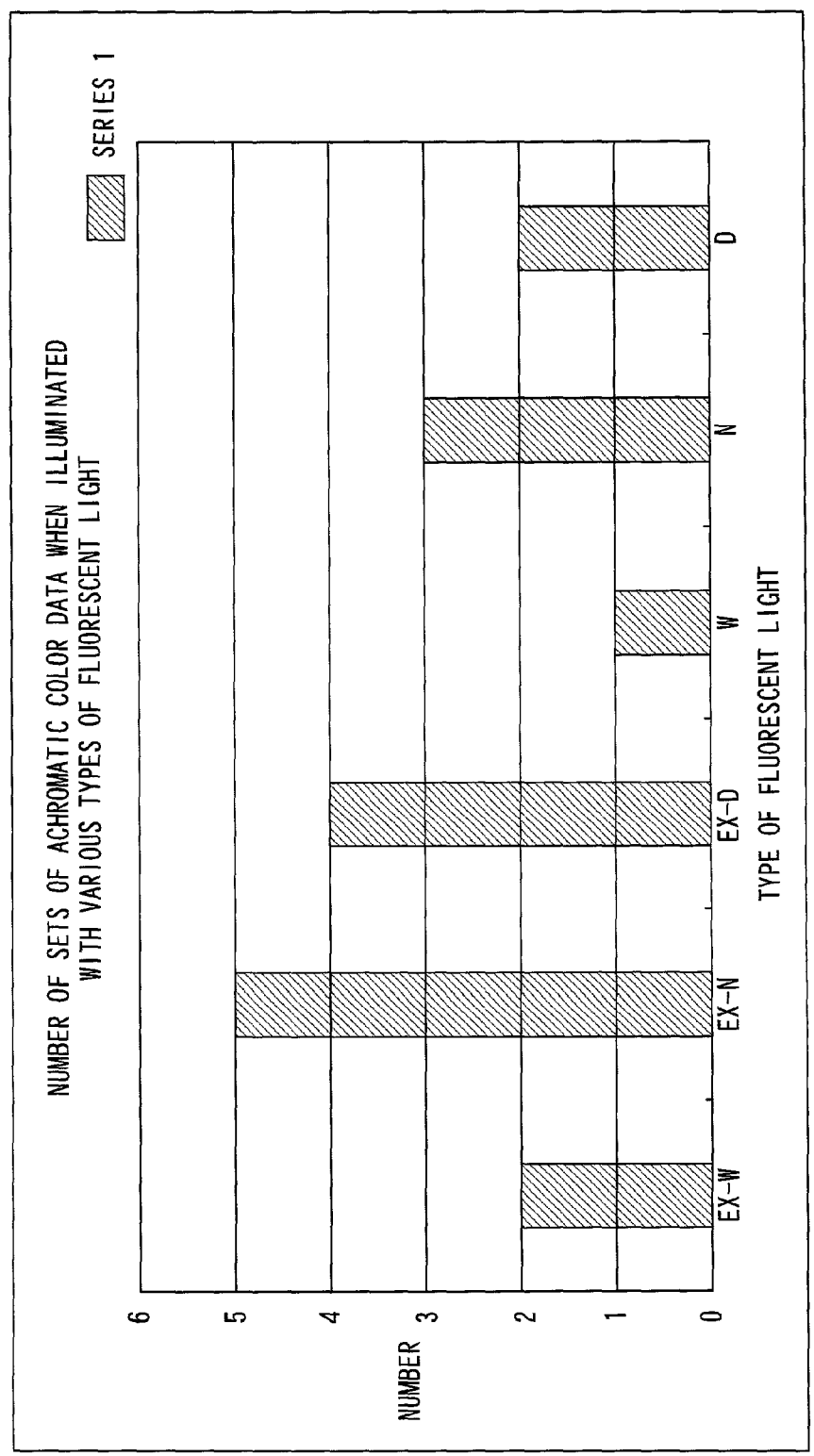
FIG. 8 presents a histogram of various areas obtained in the first embodiment.

In step S14 in FIG. 4, the CPU 35C counts the number of sets of chromaticity data in the individual areas 1~13 and creates histograms such as those shown in FIGS. 7 and 8 before proceeding to step S15. In the second embodiment, the histogram is prepared by adding the green area 13 in the histograms in FIGS. 7 and 8. In step S15, the CPU 35C increments the value indicating the number of sets of chromaticity data having been classified in this manner and then proceeds to step S16.

In step S40 in FIG. 12, the CPU 35C makes a decision as to whether or not the green area 13 contains the greatest number of sets of chromaticity data. If it is decided that the green area 13 contains the greatest number of sets of chromaticity data, the operation proceeds to step S41. In step S41, the CPU 35C makes a decision as to whether or not there are two or more areas containing the greatest number of sets of chromaticity data, i.e., whether or not there is at least one more area containing the greatest number of sets of chromaticity data in addition to the green area 13, and makes an affirmative decision in step S41 if there are two or more areas containing the greatest number of sets of chromaticity data to proceed to step S43, whereas it makes a negative decision in step S41 if there is only one area containing the greatest number of sets of chromaticity data to proceed to step S42.

In step S42, the CPU 35C calculates the averages of R/G and B/G by using all the data contained in the area with the largest number of sets of chromaticity data before proceeding to step S26. In step S43, the CPU 35C calculates the averages of R/G and B/G by using all the data contained in, for instance, the areas 3 and 4 before proceeding to step S26. The data in the area 3 and the area 4 are utilized in this process to calculate the averages of R/G and B/G with data in areas corresponding to sunlight with color temperatures close to 5000 K.

As described above, histograms are prepared by counting into consideration the possibility of the photographic scene taking on a green tinge under sunlight radiation. Then, the control is implemented by deciding that the light source is sunlight if the number of sets of chromaticity data in the green area 13 is the greatest. Thus, it becomes possible to prevent an erroneous decision that the light source irradiating the subject is a type of fluorescent light when a green subject is irradiated by sunlight.

Third Embodiment

Since the structure assumed in the electronic still camera in the third embodiment and its circuit block diagram are identical to the structure of the electronic still camera achieved in the first embodiment as illustrated in FIG. 1 and the circuit block diagram presented in FIG. 2 respectively, their explanation is omitted. In addition, the color sensor 86 is constituted of a single two-dimensional image-capturing element having 480 pixels arrayed over 48 columns (across)×10 rows (down) as shown in FIG. 3 as in the first embodiment. Also as in the first embodiment, the color sensor 86 outputs color signals in correspondence to 160 areas obtained by dividing the image-capturing surface into 160 portions.

Figure 13:
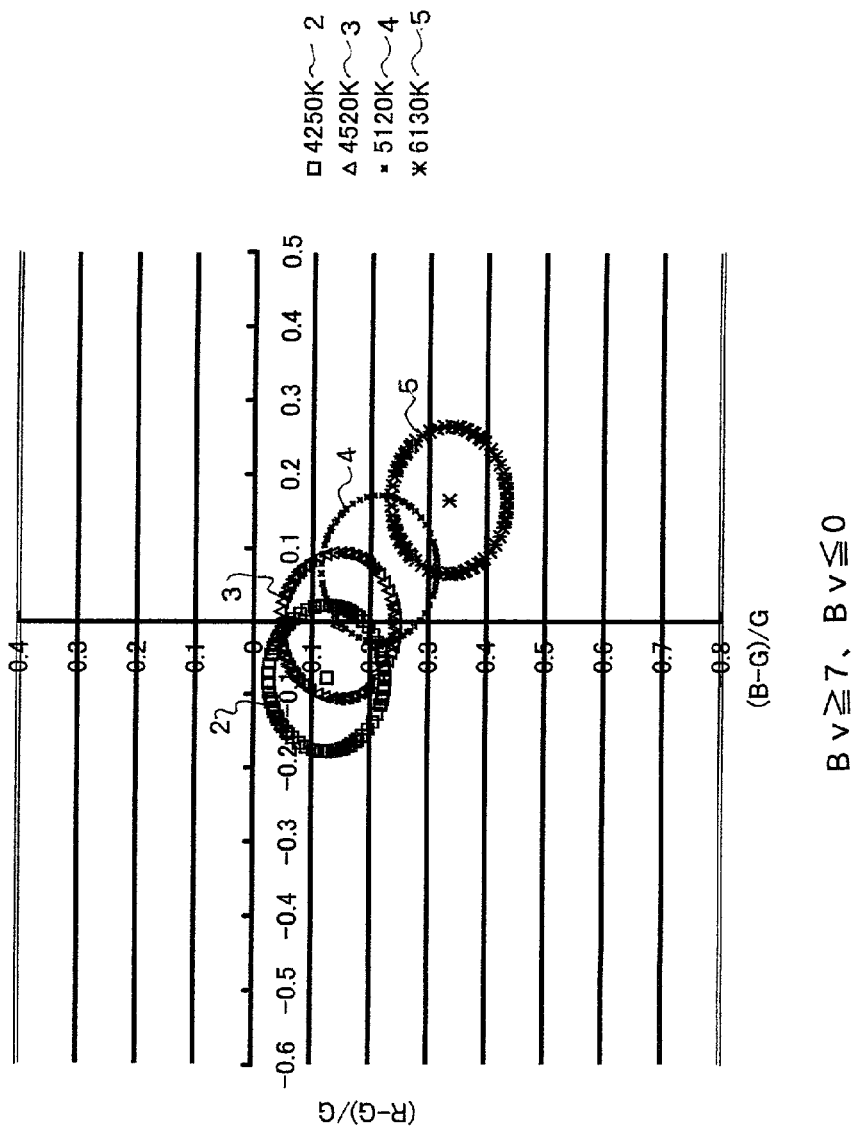
FIG. 13 shows the achromatic color distribution 1 on a chromaticity coordinate system achieved in a third embodiment.
Figure 14:
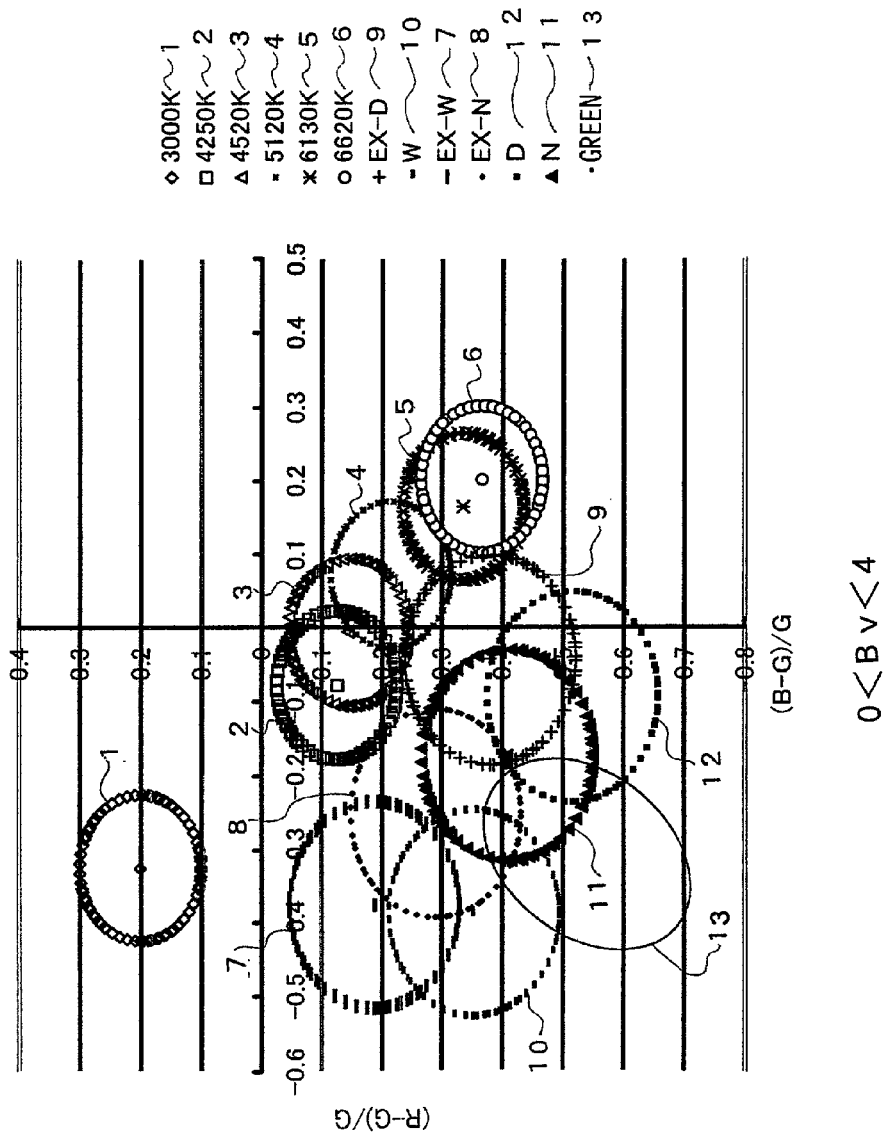
FIG. 14 shows the achromatic color distribution 2 on a chromaticity coordinate system achieved in the third embodiment.
Figure 15:
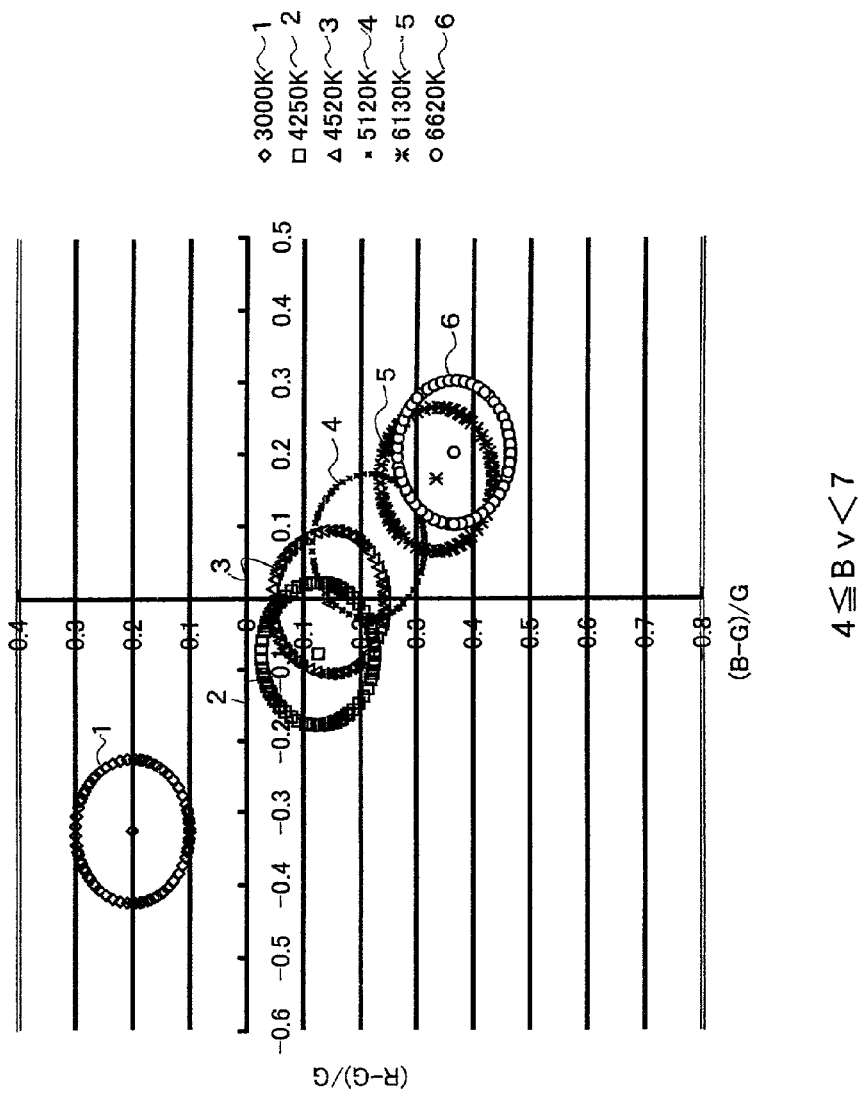
FIG. 15 shows the achromatic color distribution 3 on a chromaticity coordinate system achieved in the third embodiment.

FIGS. 13~15 correspond to FIG. 6 pertaining to the first embodiment and FIG. 11 pertaining to the second embodiment, and show the chromatic color distribution mapped on a chromaticity coordinate system in the third embodiment. In the third embodiment, different areas are selected to be used in the achromatic color decision-making process in correspondence to various brightness levels.

FIG. 13 shows an achromatic color distribution 1 on the chromaticity coordinate system manifesting when the brightness level $Bv \geq 7$ or $Bv \leq 0$. Unlike FIG. 11 illustrating the second embodiment, FIG. 13 does not include the areas 1 and 6~13 and only the areas 2~5 are set in the figure, since it is essentially unnecessary to factor in low color temperatures or high color temperatures if the brightness level Bv is very high, i.e., 7 or higher, or if the brightness level Bv is very low, i.e., 0 or lower. Namely, under such circumstances, the photographing operation can be assumed to be in progress at night or under direct sunlight. In addition, the likelihood of the illuminating light source being fluorescent light is considered low since a flash or the like would be used if the photographing operation was underway at all low brightness level under fluorescent light.

FIG. 14 shows an achromatic color distribution 2 on the chromaticity coordinate system manifesting when the brightness level is within a range of 0<BV<4. As in FIG. 11 illustrating the second embodiment, the areas 1~13 are set. The maximum number of areas is set for the brightness level range 0<BV<4, since all the possible illuminating light sources including sunlight during the daytime, fluorescent light, incandescent light and waning light from the setting sun in the evening must be considered in this brightness level range. In addition, the green area 13 is set only for this brightness level range so as not to confuse sunlight irradiating a green-colored subject and fluorescent light illumination, as in the second embodiment.

FIG. 15 shows an achromatic color distribution 3 on the chromaticity coordinate system manifesting when the brightness level is within a range of $4 \leq Bv < 7$. Unlike FIG. 11 illustrating the second embodiment, FIG. 15 does not include the areas 7~13 and only the areas 1~6 are set in the figure. While it is considered less likely that the light source is an artificial light source such as a fluorescent lamp or an incandescent lamp, the illuminating light may still manifest a low color temperature or a high color temperature over the brightness level range 4>Bv<7, and thus, a larger number of areas are set compared to the number of areas set when the brightness level $Bv \geq 7$ or $Bv \leq 0$.

Figure 16:
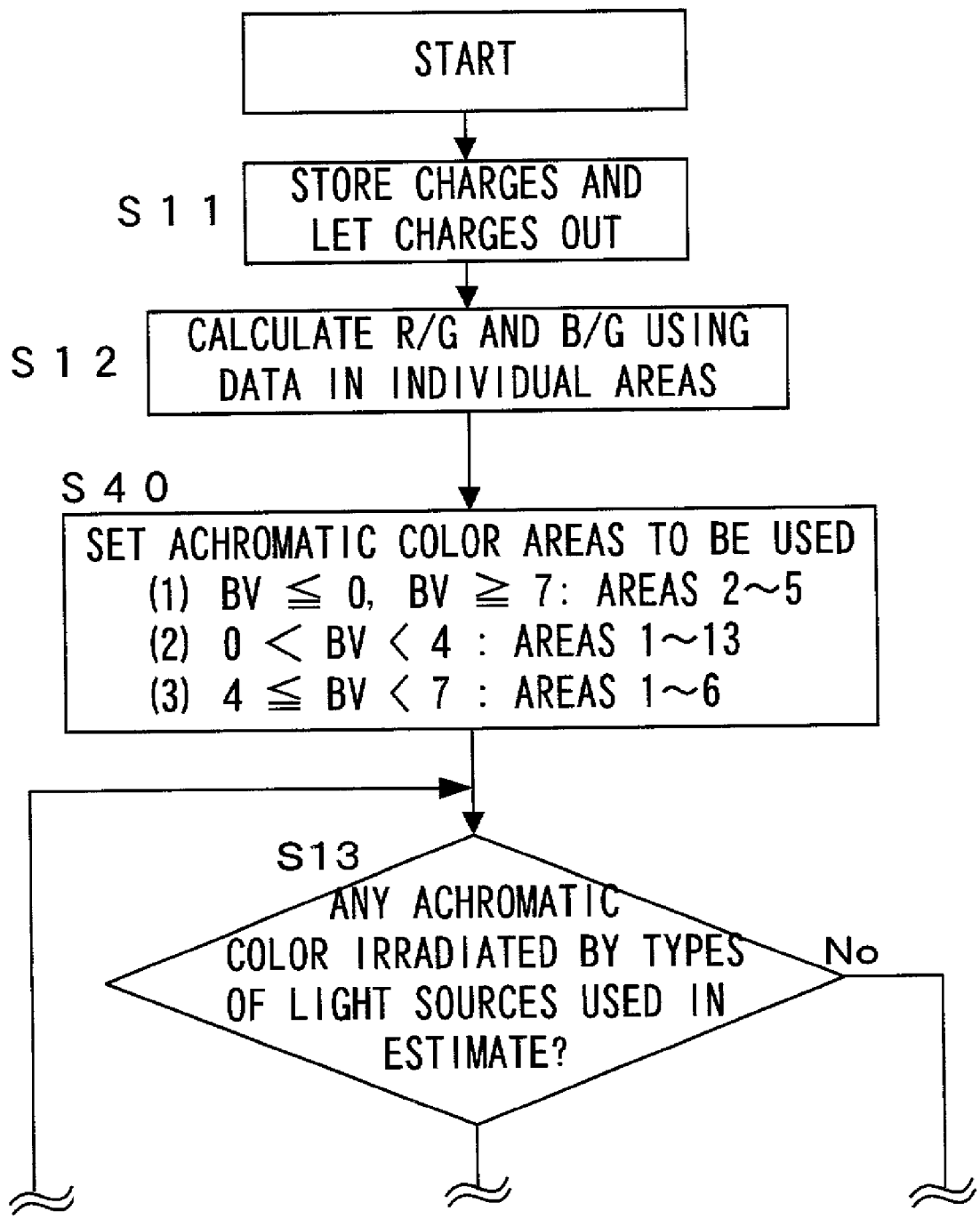
FIG. 16 presents a flowchart provided to facilitate an explanation of the flow of the processing implemented to determine the white balance adjustment gains in the third embodiment.

FIG. 16 presents a flowchart of the processing implemented in the third embodiment in order to determine the white balance adjustment gains. It corresponds to part of the flowchart pertaining to the first embodiment and the second embodiment. The processing implemented in the third embodiment differs from the processing shown in the flowchart in FIG. 4 only in that step S40 is added to be implemented following step S12. Since other steps are identical to those in FIG. 4, their explanation is omitted. In addition, an explanation of the processing identical to that in the flowchart in FIG. 12 pertaining to the second embodiment is omitted.

In step S40, the areas to be used in the achromatic color decision-making process is reset in correspondence to the brightness level Bv. If the brightness level $Bv \geq 7$ or $Bv \leq 0$, the areas 2~5 are used. When the brightness level is within the range of 0<Bv<4, the areas 1~13 are used. When the brightness level is within the range of $4 \leq Bv < 7$, the areas 1~6 are used.

By restricting the areas to be used for the achromatic color decision-making in correspondence to the brightness level in this manner, it becomes possible to prevent a miscalculation of the color temperature due to a color failure. It is not necessary to strictly adhere to the details given above when selecting areas for the achromatic color decision-making in correspondence to the brightness level. Areas different from those described above may be selected under various conditions or depending upon the various test results.

While an explanation has been given above on an example in which the present invention is adopted in a single lens reflex electronic still camera, it may be adopted in an electronic still camera other than a single lens reflex electronic still camera. In such an application, subject images should be separately formed at the image-capturing element 26 and the color sensor 86 by employing a beam splitter, a half mirror and the like. In addition, the present invention may be adopted in a video camera utilized to capture dynamic images, as well.

While the image-capturing element 26 and the color sensor 86 are provided as separate components in the explanation given above, the image-capturing element 26 may also function as a color sensor instead. In such a case, the white balance adjustment gains are determined as described earlier by using the data obtained through an image-capturing operation at the image-capturing element 26. Then, a white balance adjustment is performed by using the white balance adjustment gains on subject image data captured in response to a shutter release operation.

While the color sensor 86, which is constituted of a two-dimensional image-capturing element having 480 pixels arrayed over 48 columns (across)×10 rows (down) and includes the RGB color filter 861, outputs color signals corresponding to 160 pixels in the explanation given above, the pixels at the color sensor 86 may assume a different structure.

While an explanation has been given on an example in which the present invention is adopted in an electronic camera, the present invention may be adopted in conjunction with an apparatus other than an electronic camera. For instance, it may be adopted in a portable telephone mounted with a CCD camera or a personal computer mounted with a CCD camera. In other words, the present invention maybe adopted in all types of image-capturing devices having an image-capturing element.

Furthermore, a computer such as a personal computer may directly take in unprocessed image-capturing signals (image data) from the image-capturing element and implement the processing described above on the image data in conformance to a program in the computer. In this situation, the image-capturing signals (image data) that have been obtained should be divided into an appropriate number of groups to generate image-capturing signals the number of which is approximately equal to the number of the image capturing signals obtained at the color sensor 86 explained earlier. Processing for selecting pixels in an appropriate area among the divided areas for use or for ascertaining the averages in an appropriate area may be implemented at this time. The image-capturing signals (image data) can be obtained from the image-capturing element via an interface cable or through wireless communication, or they may be obtained via a recording medium such as a memory card or a CD.

Figure 17:
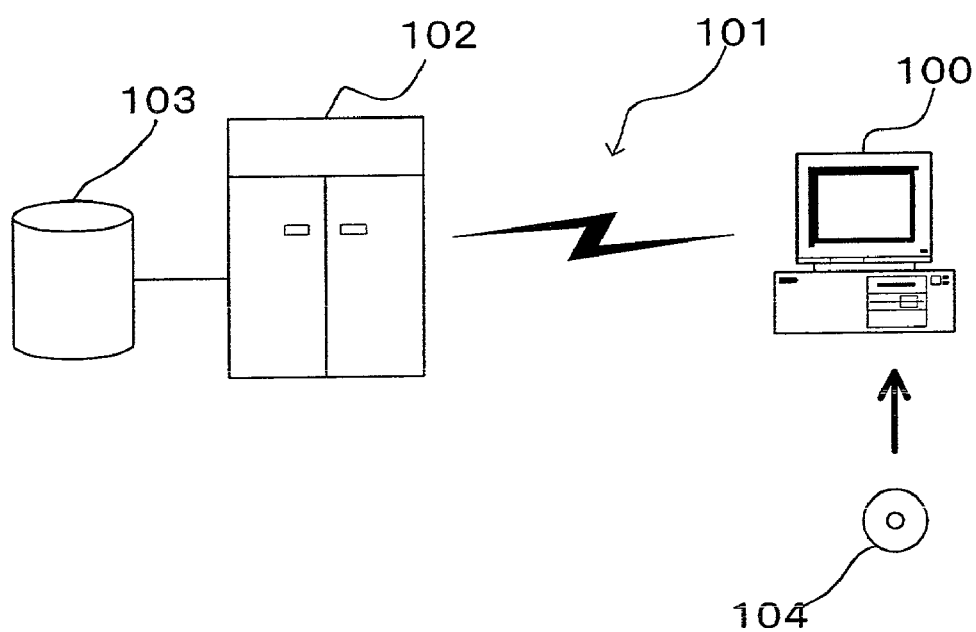

It is to be noted that when implementing the processing on a personal computer or the like, the program utilized to implement the processing may be provided in a recording medium such as a CD-ROM or through data signals on the Internet or the like. FIG. 17 illustrates how this may be achieved. A personal computer 100 receives the program via a CD-ROM 104. The personal computer 100 can be connected with a communication line 101. A computer 102 is a server computer that provides the program stored in a recording medium such as a hard disk 103. The communication line 101 may be a communication line through which Internet communication or personal computer communication may be implemented or it may be a dedicated communication line. The computer 102 reads out the program from the hard disk 103 and then transmits the program to the personal computer 100 via the communication line 101. In other words, the program which is embodied as a data signal on a carrier wave is transmitted via the communication line 101. Thus, the program can be provided as a computer-readable computer program product in any of various modes such as a recording medium and a carrier wave.

What is claimed is:

1. An image-capturing device comprising:
a first image-capturing element that captures an image of a subject and outputs a first image-capturing signal;
a second image-capturing element that captures an image of the subject and outputs a second image-capturing signal;
a light source estimating device that estimates a type of light source illuminating the subject based upon said first image-capturing signal output from said first image-capturing element; and
an image processing device that implements image processing on said second image-capturing signal output by said second image-capturing element based upon the light source type estimated by said light source estimating device.

2. An image-capturing device comprising:
an image-capturing element that captures a subject image passing through a photographic lens and outputs an image-capturing signal;
a chromaticity detection device that detects a chromaticity of the subject;
a light source estimating device that estimates a type of light source illuminating the subject based upon the chromaticity detected by said chromaticity detection device;
a gain calculating device that calculates a gain by using color temperature information corresponding to the light source type estimated by said light source estimating device; and
a gain adjustment device that performs a gain adjustment by multiplying said image-capturing signal output by said image-capturing element by the gain calculated by said gain calculating device.

3. An image-capturing device according to claim 2, wherein:
said chromaticity detection device detects the chromaticity of the subject based upon said image-capturing signal output by said image-capturing element.

4. An image-capturing device according to claim 2, wherein:
said chromaticity detection device includes a chromaticity detection image-capturing element which is independent of said image-capturing element and outputs a chromaticity detection image-capturing signal by capturing an image of the subject, and detects the chromaticity of the subject based upon said chromaticity detection image-capturing signal output by said chromaticity detection image-capturing element.

5. An image-capturing device according to claim 2, wherein:
said light source estimating device estimates the light source type by selecting a light source type corresponding to chromaticity information that roughly matches the chromaticity detected by said chromaticity detection device among a plurality of sets of chromaticity information provided in advance in correspondence to a plurality of specific light sources.

6. An image-capturing device according to claim 5, wherein:
said plurality of specific light sources include sunlight at a plurality of specific color temperatures and a plurality of specific types of fluorescent light; and
said chromaticity information is provided discretely so that each set of chromaticity information indicates a color that is substantially achromatic under illumination with sunlight at each of the plurality of color temperatures or with one of the plurality of types of fluorescent light.

7. An image-capturing device according to claim 5, wherein:
said light source estimating device selects chromaticity information to be used from said plurality of sets of chromaticity information in correspondence to the brightness level of the subject.

8. An image-capturing device according to claim 6, wherein:
said chromaticity detection device further detects whether or not the subject manifests a green color; and
said light source estimating device does not select fluorescent light as the light source if said means for chromaticity detection detects that the subject manifests a green color.

9. An image-capturing device according to claim 2, further comprising:
a first brightness level decision-making device that makes a decision as to whether or not a brightness level in each of specific areas obtained by dividing a photographic field is higher than a first predetermined value, wherein:
said chromaticity detection device detects the chromaticity of the subject in each of said specific areas;
said light source estimating device estimates a light source type among said plurality of types of light sources for each area determined to manifest a higher brightness level by said first brightness level decision-making device by using the chromaticity detected in the area and estimates one type of light source as the light source for the subject based upon numbers of different light source types estimated in individual areas; and
said gain calculating device calculates an average of levels of the chromaticity used by said light source estimating device when estimating one type of light source as the light source for the subject and calculates the gain by using color temperature information corresponding to the calculated average.

10. An image-capturing device according to claim 2, further comprising:
a second brightness level decision-making device that makes a decision as to whether or not a brightness level in each of specific areas obtained by dividing a photographic field is higher than a second predetermined value, wherein:
said light source estimating device estimates a light source type among said plurality of types of light sources for each area determined to manifest a higher brightness level by said second brightness level decision-making device by using the chromaticity detected in the area and estimates one type of sunlight as the light source for the subject based upon numbers of different light source types estimated in individual areas; and
said gain calculating device calculates an average of levels of the chromaticity used by said light source estimating device when estimating one type of sunlight as the light source for the subject and calculates the gain by using color temperature information corresponding to the calculated average.

11. An image-capturing device according to claim 10, wherein:
said gain calculating device calculates the gain by using predetermined specific color temperature information if said light source estimating device determines that sunlight at any color temperature is not the light source for the subject.

12. An image-capturing device according to claim 2, wherein:
said gain calculating device includes an LUT that outputs the gain by using the light source illuminating the subject and said color temperature information as arguments.

13. An electronic camera comprising:
an image-capturing element that captures a subject image passing through a photographic lens and outputs an image-capturing signal;
a chromaticity detection device that detects a chromaticity of the subject;
a light source estimating device that estimates a type of light source illuminating the subject based upon the chromaticity detected by said chromaticity detection device;
a gain calculating device that calculates a gain by using color temperature information corresponding to the light source type estimated by said light source estimating device; and
a gain adjustment device that performs a gain adjustment by multiplying said image-capturing signal output by said image-capturing element by the gain calculated by said gain calculating device.

* * * * *